United States Patent [19]
Hewins

[11] 3,851,737
[45] Dec. 3, 1974

[54] DISC BRAKE WITH AUTOMATIC ADJUSTING PARKING BRAKE

[75] Inventor: James A. Hewins, Fraser, Mich.

[73] Assignee: General Motors Corporation, Detroit, Mich.

[22] Filed: Mar. 4, 1974

[21] Appl. No.: 447,732

[52] U.S. Cl. ............ 188/71.9, 188/72.6, 188/106 F, 188/196 BA, 192/111 A
[51] Int. Cl. ............................................. F16d 65/56
[58] Field of Search ..... 188/71.9, 72.6, 72.9, 106 F, 188/196 BA; 192/111 A

[56] References Cited
UNITED STATES PATENTS

| | | | |
|---|---|---|---|
| 3,255,847 | 6/1966 | Gancel | 188/71.9 |
| 3,269,490 | 8/1966 | Swift | 188/71.9 |
| 3,653,470 | 4/1972 | Travis | 188/71.9 |

Primary Examiner—George E. A. Halvosa
Attorney, Agent, or Firm—D. D. McGraw

[57] ABSTRACT

A disc brake assembly is hydraulic pressure operated for service and mechanically operated for parking. The parking brake apply mechanism includes an automatic adjuster. An apply shaft is threaded through the caliper housing and into the pressurizing cylinder so that it may be rotated by arcuate movement of an apply lever and translate the arcuate movement into linear movement. An adjuster shaft extends through the apply shaft and has a land engaging the inner end of the apply shaft for linear movement therewith. The adjuster shaft has an adjuster nut threaded on its inner end with the threads being of the same hand as the threads of the apply shaft and of a lesser pitch. The adjuster nut is slidably splined into the hydraulically actuated piston and has one end engageable with the interior of the piston head to transmit forces thereto from the adjuster shaft. A ratchet adjusting mechanism on the adjuster shaft and the apply lever operates to rotate the adjuster shaft relative to the adjuster nut when a predetermined arcuate amount of movement of the apply lever is required to actuate the parking brake. The adjuster nut is then moved axially to take up the space between it and the piston head created by brake lining wear.

2 Claims, 3 Drawing Figures

DISC BRAKE WITH AUTOMATIC ADJUSTING PARKING BRAKE

The invention relates to a disc brake with a mechanically actuated parking brake providing for automatic adjustment of the disc brake as necessary. It more particularly relates to such a brake utilizing threaded members of different pitch and the same hand in conjunction with an adjuster nut slidable in a normally hydraulically actuated piston, and a ratchet type adjusting mechanism operating upon sufficient movement of a mechanical brake apply lever to rotate one of the threaded members relative to the adjuster nut and drive the nut to an adjusted position when sufficient brake applying movement of the apply lever and the other threaded member is required to actuate the brake mechanically.

Figures 1, 2, 3:
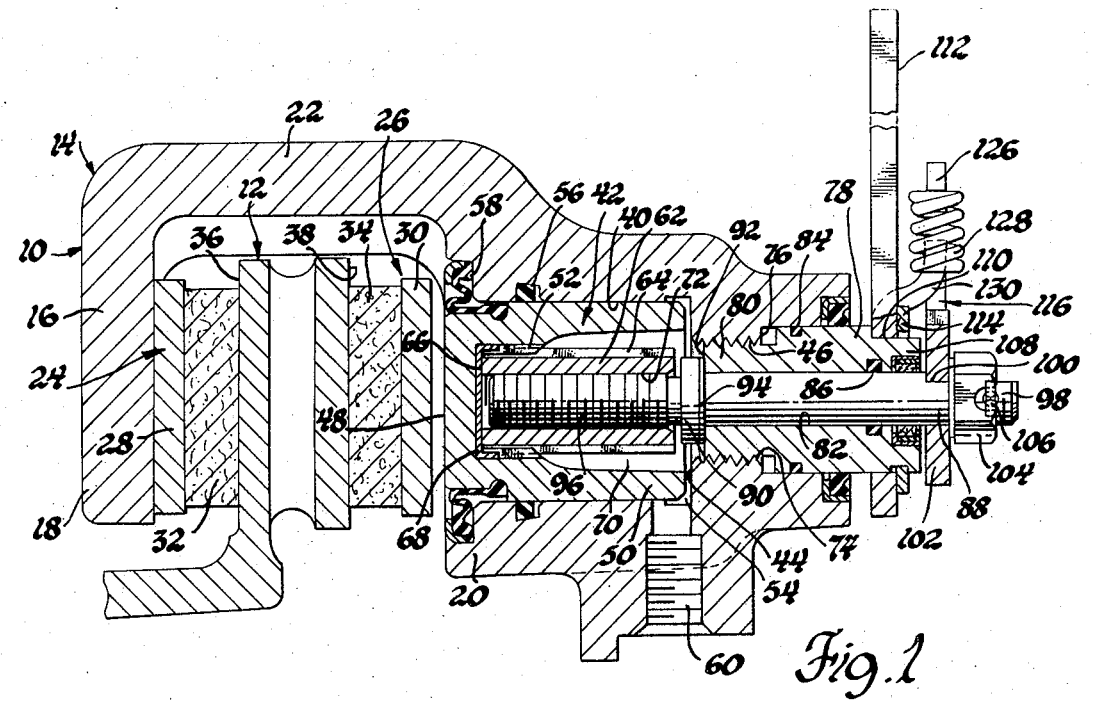
FIG. 1 is a cross section view with parts broken away and illustrates a disc brake assembly embodying the invention.
FIG. 2 is an elevation view of the disc assembly of FIG. 1, with parts broken away.
FIG. 3 is a fragmentary view of the portion of the disc brake assembly of FIG. 1 illustrating the position of certain elements thereof when the brake lining has extensively worn away, the mechanism having adjusted for such wear.

The disc brake assembly 10 includes a rotatable disc 12 to be braked and a caliper assembly 14 associated with the disc for braking action. The caliper assembly includes a caliper housing 16 having legs 18 and 20 joined by bridge section 22. Brake pad assembly 24 is positioned on one side of disc 12 and is connected with caliper leg 18. Brake pad assembly 26 is positioned on the other side of disc 12 and is connected with caliper leg 20. The brake pad assemblies respectively have backing plates 28 and 30 and brake linings 32 and 34, with the brake linings arranged to engage the opposed friction braking surfaces 36 and 38 of the disc 12.

The caliper leg 20 has formed therein a cylinder 40 in which the brake actuating piston 42 is reciprocably received. The cylinder has an end wall 44 through which a threaded aperture 46 is formed. The piston 42 has a piston head 48 in force transmitting engageable relation with the backing plate 30 of brake pad assembly 26, a piston skirt 50 which fits within cylinder 40, and internal axially extending splines 52 provided on an inner portion of skirt 50 adjacent piston head 48. The cylinder 40, the piston 42, and the cylinder end wall 44 cooperate to provide a pressure chamber 54 into which threaded aperture 46 opens. A piston seal 56 and boot 58 seal cylinder 40 from hydraulic pressure leakage and from dust respectively. A brake actuating pressure inlet 60 communicates with a brake hydraulic circuit for brake actuation in a manner well known in the art.

An axially extending adjuster nut 62 has external splines 64 mating with the piston internal splines 52 to permit axial movement of nut 62 relative to the piston 42 while preventing relative rotational movement therebetween. The forward end face 66 of nut 62 is positioned in engagement with the thrust cup 68 located in the piston recess 70 defined by piston head 48 and the piston skirt 50. The adjuster nut 62 is provided with internal threads 72 which are of the same hand as the threads 74 of threaded aperture 46 but with a lesser pitch. When similar brake assemblies are to be used on opposite sides of a vehicle, the threads in one assembly will be of the opposite hand as compared to the threads in the assembly on the other vehicle side since the mechanical brake actuating cables or rods will approach the assemblies from the same direction. However, the threads 72 and 74 in any one assembly must be of the same hand.

The caliper leg 20 has a cylindrical recess 76 formed in the outer portion thereof axially outward of aperture 46. An apply shaft 78 is rotatably mounted in cylinder 76 and has a threaded end portion 80 extending into threaded aperture 46 in threaded relation therewith. A bore 82 extends through shaft 78. Suitable seals 84 and 86 are provided to respectively seal the portion of shaft 78 in cylinder 76 and the bore 82. An adjuster shaft 88 is rotatably mounted in bore 82 in sealing relation. A land 90 is provided on a center portion of shaft 88 and is positioned to engage the end face 92 of apply shaft 78 which faces chamber 54. A thrust washer 94 may be provided between land 90 and end face 92. The inner end 96 of shaft 88 is threaded into adjuster nut 62. The outer end 98 of shaft 88 is provided with a flat 100 on which a ratchet wheel 102 is mounted. The wheel is secured to the shaft 88 by suitable means such as nut 104 and key 106. The outer end 108 of apply shaft 76 terminates in spaced relation to ratchet wheel 102 and has a flat 110 on which apply lever 112 is secured. By use of flats 100 and 110, ratchet wheel 102 must rotate with shaft 88 and apply shaft 78 must rotate with apply lever 112. A snap ring 114 holds apply lever 112 in its axial position.

A pawl lever 116 is pivotally mounted and retained on apply lever 112 by pivot pin 118 and key 120. Lever 116 has arms 122 and 124 extending substantially at right angles to each other from the area receiving pivot pin 118. Arm 122 has a spring guide 126 at its outer end which receives one end of a coiled compression spring 128. Another spring guide 130 is struck out of a portion of apply lever 112 so that it is in the plane of lever 116. Spring guide 130 receives the other end of spring 128. Therefore, as seen in FIG. 2, lever 116 is urged in a clockwise direction around pin 118 by the force of spring 128.

The other arm 124 of lever 116 terminates in a pawl 132 which cooperates with ratchet teeth 134 of ratchet wheel 102. In the preferred embodiment there are six such ratchet teeth 134. It can be seen the counterclockwise movement of the apply lever, as seen in FIG. 2, permits pawl 132 to ride over the tooth 134 with which it is cooperating, and sufficient movement will cause the pawl to be pivoted clockwise about pin 118 by the force of spring 128 when the pawl clears a ratchet tooth. Similarly, clockwise movement of apply lever 112, as seen in FIG. 2, causes pawl 132 to slide on the back side of the tooth 134 with which it is cooperating until it engages the forward face of the next tooth. Any further movement in this direction will cause rotational movement of ratchet wheel 102 and therefore rotational movement of shaft 88.

A ratchet arm 136 is pivotally mounted on the caliper leg 20 by pivot pin 138 and is retained by key 140. The other end of arm 136 from pin 138 has one end of a tension spring 142 attached thereto. The other end of spring 142 is attached to caliper leg 20 by pin 144. A ratchet pawl 146 extends from arm 136 into engagement with ratchet wheel 102 and is so positioned that it permits clockwise movement of the ratchet wheel but will, upon sufficient counterclockwise movement of the wheel, engage the forward face of one of the ratchet teeth 134 and prevent further counterclockwise movement of the ratchet wheel.

Apply lever 112 is suitably constructed at its outer end for attachment to a brake cable or rod. As is common in the art, this attachment may be a pin and clevis arrangement, with the pin extending through the opening 148 provided for this purpose. The brake release position of apply lever 112 is illustrated at 150 by dashed lines and the fully applied position is illustrated at 152 by dashed lines. The arcuate arrow 154 illustrates the movement of the apply lever through its arcuate range between positions 150 and 152. The lever is shown in solid lines in FIG. 2 with the apply lever 112 moved slightly toward the apply position from the released position. The assembly is shown in FIG. 1 as it would be immediately after installation of new brake pad assemblies but before any adjustment has taken place.

In order to initially adjust the brake, the parking brake may be applied and released several times until the brake has been adjusted. This is accomplished by moving the apply lever 112 back and forth between its positions 150 and 152 as needed. Once the brake has been adjusted, the piston head 48 is positioned in light engagement with or only slightly disengaged from backing plate 30. Seal 56 operates to move the piston 42 for a small amount in the brake release direction after the brakes have been hydraulically applied, the piston head 48 engaging the adjuster nut end face 66 to limit the release movement of the piston. The parking brakes are retained automatically in adjustment by the subsequent use of the parking brake function.

In normal service brake operation brake apply pressure is introduced into chamber 54 through inlet 60 and piston 42 is moved leftwardly to act against the brake pad assembly 26. Hydraulic reaction moves the caliper assembly 14 rightwardly to move brake pad assembly 24 into braking engagement with the disc 12. Thus braking effort is applied to both sides of the disc by the brake pad assemblies. Upon release of the brake apply pressure, the piston 42 moves slightly rightward to relieve the braking force acting on the disc and the disc is again free to rotate without any braking force being applied thereto.

When the disc brake assembly is applied manually, the apply lever 112 is initially in position 150 as illustrated in FIG. 2. As lever 112 moves counterclockwise toward position 152, the apply shaft 78 is rotated and, by action of threads 74 and the threaded section 80, the apply shaft 78 is moved inwardly in an axial direction toward disc 12. Due to the engagement of the apply shaft end face 92 and the adjuster shaft land 90, the adjuster shaft is also moved axially inward. The axial movement of shaft 88 results in the same axial movement of adjuster nut 62. Shaft 88 does not rotate relative to piston 42 since splines 52 and 64 prevent it from doing so.

The latch pawl 146 prevents extensive counterclockwise movement of ratchet wheel 102 and therefore of adjuster shaft 88 during mechanical brake application. Also, due to the gripping action of seal 56 and the construction of boot 58, piston 42 resists any rotational movement of the piston in cylinder 40. Therefore, apply shaft 78 moves arcuately relative to adjuster shaft 88 with thrust washer 94 reducing the frictional load between land 90 and the apply shaft end face 92.

Since the ratchet wheel 102 has six teeth 134 equally spaced circumferentially, each tooth is 60° apart. Therefore when the apply lever 112 exceeds this amount of arcuate movement, pawl 132 will ratchet over a tooth 134 and engage the front face of the tooth. Upon brake release, as apply lever 112 moves from position 152 toward position 150, pawl 132 will cause the ratchet wheel 102 to rotate clockwise with apply shaft 78. This results in axial movement of the adjuster nut 62 toward piston head 48 by action of the nut threads 72 and the threaded end 96 of the adjuster shaft. Therefore the brake is adjusted to a position where the brake release position of the brake pad assemblies are at a minimum adjusted clearance. The brake may then be applied hydraulically or mechanically through numerous brake actuations until sufficient lining wear occurs to again permit pawl 132 to ratchet to the next tooth 134 upon a mechanical actuation. The brakes will then be adjusted again. This action will continue as the brake linings wear, with the mechanism eventually reaching the position shown in FIG. 3. At this time the brake pad assemblies must be replaced and the piston and adjusting mechanism must be returned to the position shown in FIG. 1, and the brake is again actuated mechanically to provide an initial adjustment.

What is claimed is:

1. A disc brake comprising:
   a caliper having a housing, brake shoes mounted therein for braking engagement with a disc, and a piston for hydraulically actuating the brake, said piston being mounted for axial movement in a cylinder formed in said housing;
   a mechanically actuated brake apply shaft having a bore extending axially therethrough, said shaft extending into said cylinder coaxially with said piston and threadedly engaging said housing for rotational movement and consequent axial movements in brake apply and release directions;
   an adjuster shaft rotatably mounted in said apply shaft bore and having a land engaging one end of said apply shaft so as to be moved axially therewith and thereby in the brake applying direction of movement of said apply shaft, one end of said adjuster shaft being threaded with a lesser thread pitch than and of the same hand as the threads threadably joining said apply shaft and caliper housing;
   an adjuster nut splined to said piston so as to be limited to axial movement relative to said piston, said nut also threadedly engaging the threaded end of said adjuster shaft, one end of said nut being axially engageable with said piston in force transmitting relation to limit brake releasing movement of said piston and to apply brake actuating force thereto when said apply shaft is mechanically actuated to move said apply shaft and said adjuster shaft and said adjuster nut axially in the brake apply direction;
   an actuating lever on said brake apply shaft for rotating said apply shaft by arcuate movement of said actuating lever within a predetermined arcuate stroke angular range;
   a ratchet wheel on said adjuster shaft having a plurality of teeth thereon circumferentially equally spaced apart at angles therebetween substantially equal to and no greater than the angle of said actuating lever arcuate stroke angular range;

a spring loaded pawl pivotally mounted on said actuating lever and riding on said ratchet wheel and, upon arcuate movement of said actuating lever through an angle equal to the angle between adjacent of said ratchet wheel teeth in the brake apply direction, engaging one wheel tooth so as to rotate said ratchet wheel an angular distance substantially equal to said angular range upon return movement of said actuating lever to the brake release position, thereby rotating said adjuster shaft and causing said adjuster nut to move axially in the brake apply direction to adjust the brake;

and a latch pawl mounted on said housing and yieldingly engaging said ratchet wheel to prevent rotation thereof in the other direction of rotation for an angular distance greater than the angular distance between two adjacent ratchet wheel teeth.

2. A manual disc brake actuator and adjuster mechanism comprising:

a housing having therein piston and cylinder means for applying force to brake pad assemblies to actuate a disc brake;

a manual brake apply and release mechanism including:

a threaded rotatable and axially movable first member threadedly received in said housing, a threaded rotatable and axially movable second member rotatably received in said first member and axially movable therewith, a third member in said cylinder means splined to said piston means so as to be limited only to axial movement relative thereto and threadedly received on said second member so as to be axially moved by rotational movement of said second member and also by axial movement of said second member toward said piston, said third member having an end face axially engageable with said piston means in force transmitting relation;

a brake apply lever secured to said first member and manually arcuately movable to rotate said first member in said housing and by the threaded action to axially move said first member;

and ratchet means including a toothed ratchet wheel on said second member, a latch pawl on said housing engaging said ratchet wheel to limit arcuate movement thereof in one direction according to the circumferential spacing of adjacent teeth of the wheel, and an adjuster pawl pivotally mounted on said brake apply lever and yieldingly engaging said ratchet wheel and upon sufficient arcuate movement of said brake apply lever in the brake apply direction ratcheting over a tooth of said wheel and drivingly engaging that tooth upon brake releasing movement of said brake apply lever to move said wheel and therefore said second member arcuately relative to said third member to cause said third member by thread action to move axially in the brake apply direction to provide an adjusted position of said piston means in said cylinder means upon brake release.

* * * * *